(12) United States Patent
Jiang et al.

(10) Patent No.: US 11,416,501 B2
(45) Date of Patent: *Aug. 16, 2022

(54) CUSTOMIZED COORDINATE ASCENT FOR RANKING DATA RECORDS

(71) Applicant: Ancestry.com Operations Inc., Lehi, UT (US)

(72) Inventors: Peng Jiang, Sunnyvale, CA (US); Gann Bierner, Oakland, CA (US); Lei Wu, San Ramon, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/822,388

(22) Filed: Mar. 18, 2020

(65) Prior Publication Data

US 2020/0218727 A1 Jul. 9, 2020

Related U.S. Application Data

(63) Continuation of application No. 16/481,027, filed as application No. PCT/US2018/036058 on Jun. 5, 2018, now Pat. No. 10,635,680.

(Continued)

(51) Int. Cl.
*G06F 16/2457* (2019.01)
*G06N 20/00* (2019.01)
(Continued)

(52) U.S. Cl.
CPC ...... *G06F 16/24578* (2019.01); *G06F 16/248* (2019.01); *G06N 7/005* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,166,026 B1 | 4/2012 | Sadler | |
| 8,572,011 B1 * | 10/2013 | Sculley, II | G06N 20/00 706/13 |

(Continued)

OTHER PUBLICATIONS

Academic Benchmark, "Domain: Learning to Rank," n.d., 3 pages [Online] [Retrieved Sep. 3, 2019], Retrieved from the internet <URL: http://www.bigdatalab.ac.cn/benchmark/bm/Domain?domain=Learning%20to%20Ra- nk>.

(Continued)

*Primary Examiner* — Uyen T Le
(74) *Attorney, Agent, or Firm* — Fenwick & West LLP

(57) ABSTRACT

A method for ranking genealogical records includes using a machine learning model to rank multiple searched records based on relevancy. The relevancy may be determined by identifying features included in a record and scaling each feature by a corresponding weight factor. In addition, a method for training a machine learning model and increasing the convergence speed of the training is described. To train the model, a machine learning process is used to optimize a ranking performance metric. A set of weights corresponding to multiple features are used to rank multiple past search records in a training set. An initial set of the weights are set by the expectation values of the weights. The weights are incrementally changed to optimize the ranking performance metric. The step size of the increment is determined based on the sensitivity of the ranking performance metric relative to the step size.

20 Claims, 13 Drawing Sheets

Related U.S. Application Data

(60) Provisional application No. 62/515,435, filed on Jun. 5, 2017.

(51) Int. Cl.
  *G06F 16/248* (2019.01)
  *G06N 7/00* (2006.01)

(56) References Cited

U.S. PATENT DOCUMENTS

| | | | |
|---|---|---|---|
| 2011/0106819 | A1 | 5/2011 | Brown et al. |
| 2012/0158685 | A1* | 6/2012 | White ............... G06F 16/9535 707/706 |
| 2013/0110824 | A1 | 5/2013 | DeRose et al. |
| 2014/0006433 | A1 | 1/2014 | Hon et al. |
| 2016/0216857 | A1 | 7/2016 | Hulet et al. |
| 2017/0017752 | A1 | 1/2017 | Noto et al. |
| 2017/0188101 | A1 | 6/2017 | Srinivasaraghavan |

OTHER PUBLICATIONS

Burges, C., et al., "Learning to rank using gradient descent," Proceedings of the 22nd International Conference on Machine learning (ICML-05), 2005, pp. 89-96.
Cao, Y. et al., "Adapting ranking SVM to document retrieval," Proceedings of the 29th annual international ACM SIGIR conference on Research and development in information retrieval, 2006, pp. 186-193.
Cao, Z. et al., "Learning to rank: from pairwise approach to listwise approach," Proceedings of the 24th international conference on Machine learning, Jun. 2007, pp. 129-136.
Cortes, C. et al., "Support-vector networks," Machine learning, 1995, vol. 20, No. 3, pp. 273-297.
Freund, Y. et al., "An efficient boosting algorithm for combining preferences," Journal of machine learning research, Nov. 2003, vol. 4, 933-969.
Hawking, D. et al., "Overview of the TREC 2003 Web Track," TREC 2003 Web Track, Mar. 22, 2004, 15 pages.
Hersh, W. et al., "OHSUMED: an interactive retrieval evaluation and new large test collection for research," SIGIR'94, 1994, pp. 192-201.
Ho, T. K., "Random decision forests," Proceedings of 3rd international conference on document analysis and recognition, IEEE, 1995, vol. 1, pp. 278-282.
Jain, V. et al., "Learning to re-rank: query-dependent image re-ranking using click data," Proceedings of the 20th international conference on World wide web, ACM, 2011, pp. 277-286.
Joachims, T., "Optimizing search engines using clickthrough data," Proceedings of the eighth ACM SIGKDD international conference on Knowledge discovery and data mining, ACM, 2002, pp. 133-142.
Karimzadehgan, M. et al., "A stochastic learning-to-rank algorithm and its application to contextual advertising," Proceedings of the 20th international conference on World wide web, ACM, 2011, pp. 377-386.
Li, H., "A short introduction to learning to rank." IEICE Transactions on Information and Systems, 2011, vol. 94, No. 10, pp. 1854-1862.
Li, P. et al., "McRank: Learning to rank using multiple classification and gradient boosting," Advances in neural information processing systems, 2008, pp. 897-904.
Liu, T.Y., "Learning to rank for information retrieval," Foundations and Trends.RTM. in Information Retrieval, 2009, vol. 3, No. 3, 36 pages.
Lv, Y. et al. "Learning to model relatedness for news recommendation," Proceedings of the 20th international conference on World wide web, ACM, 2011, pp. 57-66.
Metzler, D. et al., "Linear feature-based models for information retrieval." Information Retrieval, 2007, vol. 10, No. 3 pp. 257-274.
PCT International Search Report & Written Opinion, International Application No. PCT/US2018/036058, dated Sep. 20, 2018, 14 Pages.
Radlinski, F. et al., "Learning diverse rankings with multi-armed bandits," Proceedings of the 25th international conference on Machine learning, ACM, 2008, pp. 784-791.
Tagami, Y., et al., "Ctr prediction for contextual advertising: Learning-to-rank approach," Proceedings of the Seventh International Workshop on Data Mining for Online Advertising, ACM, 2013, 8 pages.
Tax N. et al., "A cross-benchmark comparison of 87 learning to rank methods," Information processing & management, 2015, vol. 51, No. 6, pp. 757-772.
Taylor, M.J.G et al., "Softrank: optimizing non-smooth rank metrics," Proceedings of the 2008 International Conference on Web Search and Data Mining, ACM, 2008 pp. 77-86.
Walker, S. H. et al., "Estimation of the probability of an event as a function of several independent variables." Biometrika 1967, vol. 54, No. 1-2, pp. 167-179.
Wikipedia, "Coordinate Descent," Last edited Jul. 24, 2019, 5 pages [Online] [Retrieved Sep. 3, 2019], Retrieved from the internet <URL: https://en.wikipedia.org/wiki/Coordinate_descent>.
Wikipedia, "Discounted cumulative gain," Last edited Aug. 23, 2019, 5 pages [Online] [Retrieved Sep. 3, 2019], Retrieved from the internet <URL: https://en.wikipedia.org/wiki/Discounted_cumulative_gain>.
Wikipedia, "Learning to Rank," Last edited Jul. 3, 2019, 11 pages [Online] [Retrieved Sep. 3, 2019], Retrieved from the internet <URL: https://en.wikipedia.org/wiki/Learning_to_rank>.
Wu, Q. et al., "Adapting boosting for information retrieval measures," Information Retrieval, 2010, vol. 13, No. 3, pp. 254-270.
Xu, J. et al., "Adarank: a boosting algorithm for information retrieval," Proceedings of the 30th annual international ACM SIGIR conference on Research and development in information retrieval, ACM, 2007, pp. 391-398.
Yu, J. et al., "Learning to rank using user clicks and visual features for image retrieval," IEEE transactions on cybernetics, 2014, vol. 45, No. 4, pp. 767-779.
European Patent Office, Extended European Search Report and Opinion, EP Patent Application No. 18813962.0, dated Feb. 4, 2021, eight pages.
Koopmann, J., "Just SQL Part VII—Hierarchical Queries," Oct. 5, 2005, six pages, [Online] [Retrieved on Jan. 13, 2021] Retrieved from the Internet <URL: https://www.databasejournal.com/features/oracle/article.php/3355252 1/Just-SQL-Part-VII-150-Hierarchical-Queries.htm>.

\* cited by examiner

SEARCH

RECORD
All Records
Census
Vital Records
  Death
  Birth
  Marriage
  Divorce
Military
Immigration & Passenger Lists

PEOPLE
Living People Search
City & Telephone Directories

TREES
Family Trees

First Name: John x    ☐ Exact

Last Name (Required): Smith x    ☐ Exact

Middle Name

Maiden Name

Location (City, County, State, Country)

Birth Year: 1920 x    +/- ▶

Collection: 1940 U.S. Federal Population Census ▶

🔍 SEARCH NOW

FIG. 1

Name / Year /
John Smith Birth 1920

⇅ Filter By  Clear all

RECORD
Census
Death (6,992,392)                    ✕
Birth (3,170,205)
Marriage (3,256,643)
Divorce (284,732)
Obituaries (605,909)
Cemetery Listings (1,645,074)
City & Telephone Directories (3,284,000)
More Records  ›

LOCATIONS
United States (1,547,568)
New York (115,380)
Pennsylvania (100,564)
Texas (83,775)

🔍 EDIT SEARCH

Census: 1,547,568 — Pg 1

Name John Dean Smith
Mother Wilma Smith
Father Winston Smith
Birth 1920 Missouri
Residence Sweet Springs, Saline, Missouri
Collection 1940 U.S. Federal Population Census
▸ Members in Household

Name John Smith
Spouse Grace Smith
Birth 1920 North Carolina
Residence Caroleen-Avondale-Henrietta, Rutherford, North Carolina
Collection 1940 U.S. Federal Population Census
▸ Members in Household

FIG. 2

← RESULTS

| | |
|---:|:---|
| Name | John Dean Smith |
| Age | 20 |
| Estimated Birth Year | 1920 |
| Gender | Male |
| Race | White |
| Birthplace | Missouri |
| Marital Status | Single |
| Relation to Head of House | Son |
| House Number | 401 |
| Inferred Residence in 1935 | Sweet Springs, Sallline, Missouri |
| Residence in 1935 | Same House |
| Street Number | 4B |
| Occupation | Indenter |
| Industry | Shoe Factory |
| Attended School or College | No |
| Highest Grade Completed | High School, 4th year |
| Class of Worker | Wage or salary worker in Government work |
| Weeks Worked in 1939 | 52 |
| Income | 480 |
| Income Other Sources | No |
| Members in Household | Winston Smith (73 yrs) Wilma Smith (58 yrs) |
| Collection | 1940 Federal Population Census |

[ SAVE ]  [ PRINT ]

FIG. 3

```
weight initialization for each feature
repeat the following steps:
    for feature i:
        for each sign:
            repeat n_iterations times:
                update w_i by sign and step size
                if w_i improves NDCG:
                    break;
    if NDCG improvement < tolerance:
        break;
```

| record | label | $f_1$ | $f_2$ | $f_3$ | $f_4$ |
|---|---|---|---|---|---|
| $r_1$ | 1 | 1 | 0 | 1 | 0 |
| $r_2$ | 1 | 1 | 0 | 1 | 1 |
| $r_3$ | 0 | 0 | 1 | 1 | 1 |
| $r_4$ | 0 | 0 | 0 | 0 | 0 |

FIG. 7B

| | $f_1$ | $f_2$ | $f_3$ | $f_4$ |
|---|---|---|---|---|
| $fre\_rel$ | 2 | 0 | 2 | 1 |
| $fre\_irrel$ | 0 | 1 | 1 | 1 |
| $w$ | 1 | 0 | 2/3 | 0.5 |

FIG. 7C

| record | label | $s_{new}$ | $rank_{new}$ | $s_{old}$ | $rank_{old_1}$ | $rank_{old_2}$ |
|---|---|---|---|---|---|---|
| $r_1$ | 1 | 1.67 | $r_2$ | 0.5 | $r_2$ | $r_3$ |
| $r_2$ | 1 | 2.17 | $r_1$ | 0.75 | $r_3$ | $r_2$ |
| $r_3$ | 0 | 1.17 | $r_3$ | 0.75 | $r_1$ | $r_1$ |
| $r_4$ | 0 | 0 | $r_4$ | 0 | $r_4$ | $r_4$ | tion, etc.

CUSTOMIZED COORDINATE ASCENT FOR RANKING DATA RECORDS

CROSS REFERENCE TO RELATED APPLICATIONS

This application is a continuation of prior, co-pending U.S. application Ser. No. 16/481,027, filed on Jun. 5, 2018, which is a National Stage Entry of International Application No.: PCT/US2018/036058, filed on Jun. 5, 2018, which claims the benefit of U.S. Provisional Application No. 62/515,435 filed Jun. 5, 2017, all of which are incorporated by reference in their entirety.

BACKGROUND

This disclosure relates generally to ranking genealogical records. Specifically, this disclosure relates to increasing the convergence speed of a machine learning model that can rank genealogical records.

A large-scale genealogical index can include billions of data records. Owing to the age of some of those records, the data records in a genealogical index are often obtained by digitalizing various paper documents via optical character recognition (OCR) and indexing the scanned data into a database. Another source of data may come from users' manual input of family history and data. The data in a genealogical index are often noisy due to mistakes on the original documents, especially dated documents, transcription errors, OCR errors, misreported and mistyped informa- A genealogical index allows users of a genealogical system to build their family trees, research their family history, and make meaningful discoveries about the lives of their ancestors. When users search a large collection of records for their ancestors, it is important for the genealogical system to return the most relevant records. However, a genealogical search is different from an ordinary web search in several aspects. First, typical genealogical queries often are short and include only names, birth year, and birth place. Second, an imbalance between the number of relevant samples and irrelevant samples fails a lot of state of the art ranking models. Third, the large amount of typos and inaccurate values in records also often deteriorates the search results. As a result of those reasons, a query often results in a long list of potentially relevant records. This makes the ranking of the searched results particularly important, yet challenging.

SUMMARY

Disclosure described herein relates to methods and processes for ranking data records based on likelihoods that the data records are relevant to a user query. For example, in a genealogical system, a user may provide a query that specifies one or more characteristics, which can be names, year of birth, place of birth, other vital characteristics, etc. In response, the genealogical system conducts a search to identify multiple records based on the user query. The genealogical system then displays a list of records that are ranked based on the likelihoods of the records being relevant to a user query. The ranking may be performed by a machine learning model that is trained to perform a ranking operation.

More specifically, in accordance with an embodiment, a method for searching data records is described. The data records can be genealogical records but may also be other types of records. The method includes receiving a user query that specifies one or more characteristics. To address the potential noise in the data, multiple features are derived from the characteristics specified in the user query to expand the search process. The features are variations and/or generalizations of the characteristics that allow the search process to locate additional potentially relevant records. Multiple data records in a database are then identified based on the generated features. The data records identified are input into a computer model trained to rank the records based on likelihoods of the genealogic records being relevant to the user query. A likelihood of relevancy for a given record may be quantified by a relevancy score that is determined based on the features present in the record with each feature being scaled by the feature's corresponding weight factor. Different features have different importance in terms of relevancy (e.g., exact spelling of a name is likely more important than a variation of the name). Hence, the machine learning model is trained to determine the appropriate weight factors for different features in order to increase the accuracy in determining the likelihood of relevancy.

To further improve the quality and accuracy of the ranking, a method for training and increasing a convergence speed of a machine learning model is described, in accordance with an embodiment. The method includes receiving a training set for the machine learning model. The training set includes multiple past search records associated with different features. The past search records in the training set are also labeled by relevancy determinations that are determined based on past user actions associated with the past search records. For example, a past search record may be labeled as relevant when a user saved the past search record after a query. The machine learning model then optimizes a ranking performance metric using the training set through a machine learning process, such as a coordinate ascent process. The ranking performance metric is determined based on a rank list of the past search records that are ranked in accordance with a given set of values of weights of the features. The process may attempt different sets of values of weights to generate different rank lists until the ranking performance metric is no longer improved (e.g. the model has achieved convergence).

There can be one or more approaches to increase the convergence speed of the training of the machine learning model. A first approach includes setting initial weights of the features based on expectation values of the weights of the features. The expectation values are determined based on the past search records (e.g. how often a feature appears in relevant past search records). A second approach includes adjusting the weights of the features through increments of changes to optimize the ranking performance metric. The step size of each increment is determined based on the sensitivity of the ranking performance metric relative to the step size of each increment. By studying the sensitivity of the ranking performance metric, a large step size may be used to increase the speed of convergence while the performance of the model is not affected. By using one or more of these approaches, the convergence speed of the machine learning model can increase in an order of magnitude of ten folds. This allows a rank model to be updated frequently in use with fast changing databases such as a genealogical index.

While this disclosure is described with exemplary embodiments that are associated with genealogical data, the ranking methods and the training processes of a machine learning model that increase the convergence speed of the model described herein can be applied to other areas of record ranking and are not limited to the field of genealogy.

BRIEF DESCRIPTION OF THE DRAWINGS

FIG. 1 is a diagram illustrating an exemplary search user interface of a genealogical system, in accordance with an embodiment.

FIG. 2 is a diagram illustrating a result of a query that shows a list of searched records, in accordance with an embodiment.

FIG. 3 is a diagram illustrating a page of detailed data of a genealogical record, in accordance with an embodiment.

FIG. 6A illustrates exemplary pseudo-codes of a machine learning process, in accordance with an embodiment.

FIGS. 7A, 7B, and 7C illustrate different tables for calculating expectation values of weights, in accordance with an embodiment.

Figure 4A:
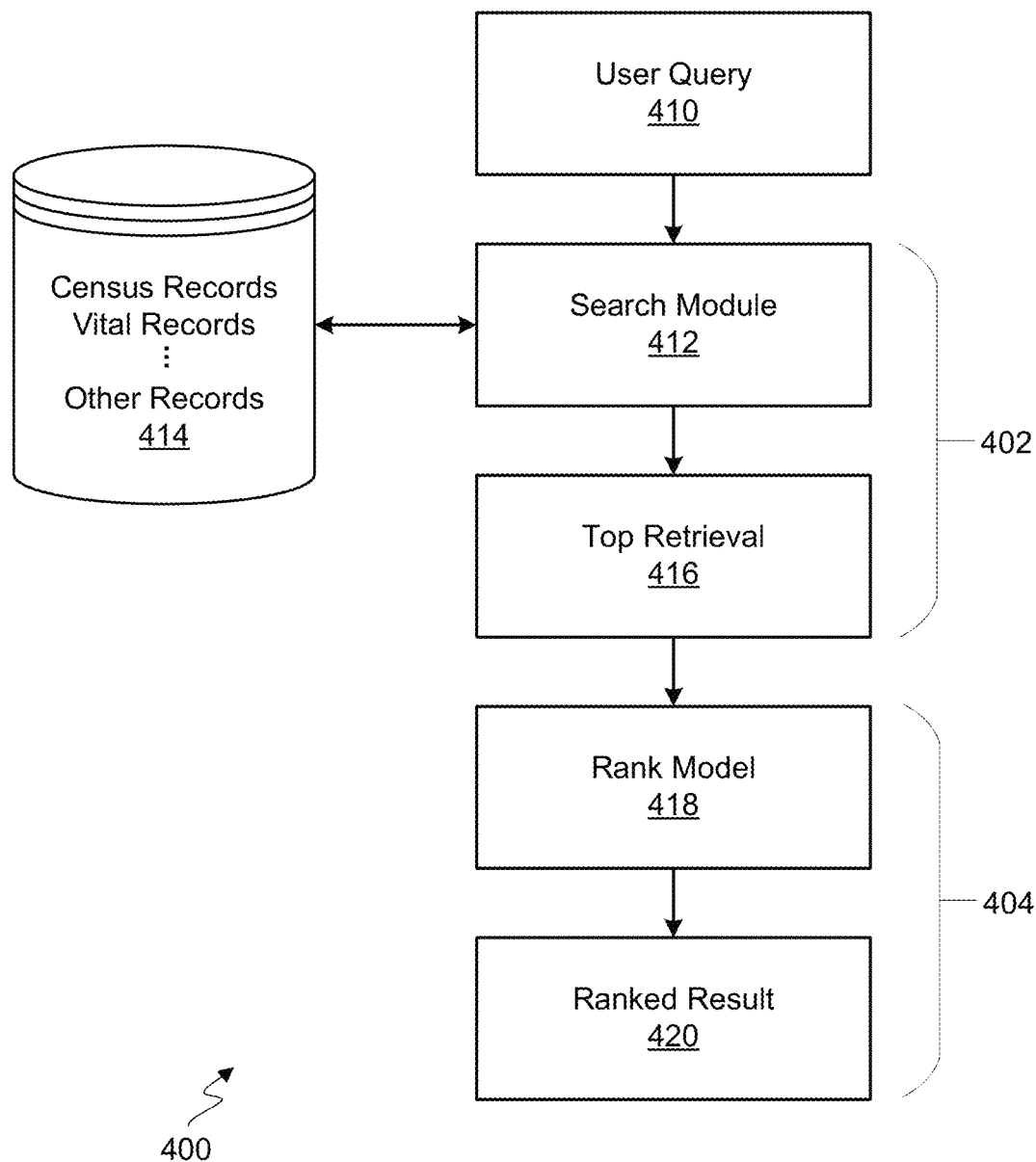
FIG. 4A is a block diagram illustrating a process of searching genealogical records, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates an exemplary search user interface of a genealogical system where users may initiate a search query for a genealogical index, in accordance with an embodiment. A genealogical index may include different types of data records including names, relations, birth records, death records, marriage records, adoption records, census records, obituary records, etc. A user query for a genealogical index may specify one or more genealogical characteristics. Here, genealogical characteristics refer to descriptions, attributes, and vitals of persons in the genealogical index. For example, genealogical characteristics may include name, gender, spouse's information, relatives' information, dates, places for life events (e.g., birth and death), other vital data, etc. An example query shown in FIG. 1 is given by specifying three fields: First Name is John, Last Name is Smith, and Birth Year is 1920. The query is for 1940 United States Federal Census. The data from a genealogical index may include textual content such as family history records. The data may also include structured content such as obtained from census data, birth certificates, marriage certificates, death records, etc.

FIG. 2 shows a page of the query result of a user query returned by a genealogical system, in accordance with an embodiment. The query result may include more than one genealogical records provided in a list. For example, FIG. 2 shows a first record associated with the person "John Dean Smith" and a second record associated with the person "John Smith." Since multiple records are often returned by the genealogical system as a result of receiving a user query, the genealogical system needs a ranking system to rank the searched results to display the searched records in order. A user may go through some of the records in the list by clicking one or more of the records. In response to the user selection, the genealogical system provides a second page that includes more details of the selected record.

FIG. 3 shows the detailed content of a record when a user selects the record from the list shown in FIG. 2. The user may examine the record in more detail in order to determine whether the record is associated with the person for whom the user is searching. When the user determines that the person is relevant, the user often takes action associated with the record. The genealogical interface may provide different action buttons for the users. For example, in FIG. 3, there are two buttons at the bottom for saving and printing of the record. If a user has taken an action for a given record, the record is considered to be relevant to the query. Such user action associated with the search query is saved in a data log.

In some cases, less than 3% of records are relevant to a given query. This generates a very imbalanced training data for machine training processes to be discussed below. In addition, most queries are very short. Most frequent query composes of only four keywords: last name, first name, birth year, and birth place. A Short query will result in a very large number of records in the returned list, which make it hard to find the most relevant ones from a long list. As a result of the imbalanced data, short query, and the noise in data, ranking data records in genealogy is quite challenging.

Search and Rank Method

FIG. 4A is a block diagram illustrating a process 400 of searching genealogical records, in accordance with an embodiment. The process 400 in general includes two phases, which are a search phase 402 and a rank phase 404. In the first search phase 402, a search module returns a certain number of top records for each query. In the second rank phase 404, a rank model ranks the top records based on likelihoods that the records are relevant to the user query. In one embodiment, the rank model is a machine learning model, which may also be referred to as a computer model, computer trained model or simply a trained model.

The process 400 may start when a user provides a user query 410. In response and based on the user query 410, a search module 412 searches through a genealogical index 414 that includes one or more databases of genealogical data. The databases include different genealogical records, including census records, vital records, and the like. The search module 412 returns the top retrieval 416 that could include a certain number of top records that best match the user query 410. In one embodiment, the number of records returned by the search module 412 is 100. In another embodiment, the number of records returned by the search module 412 is determined by the user. A rank model 418 then determines the likelihood of relevancy of each returned record and ranks the records by the likelihood. The ranked result 420 is presented to the user in a graphical user interface.

Figure 4B:
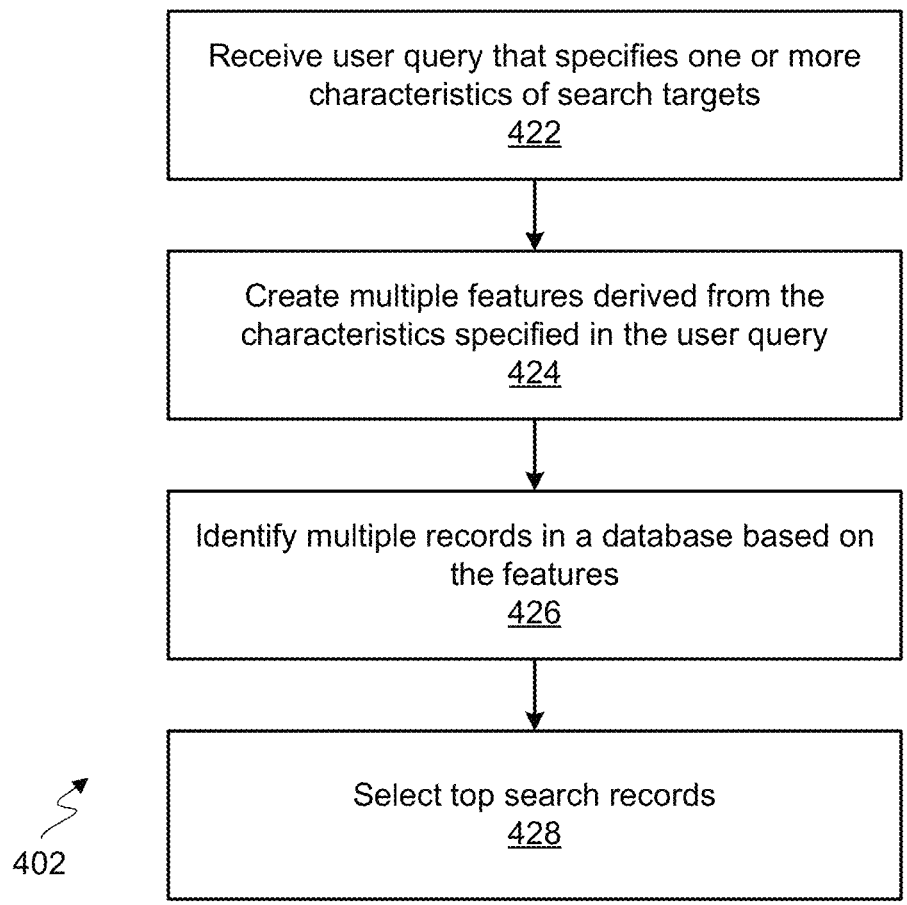
FIG. 4B is a flowchart depicting a search phase performed by a query system, in accordance with an embodiment.

More specifically, FIG. 4B is a flowchart illustrating the search phase 402 that may be performed by a search module 412, in accordance with an embodiment. In 422, the search module receives a user query that includes one or more genealogical characteristics of search targets. Queries are typically a partial description of a person and may specify the search targets' characteristics such as name, gender, relatives, dates, places for life events (e.g., birth and death), and other vitals. Queries may be noisy due to typographical errors and misinformation in the queries. It is rather common, for example, for a user to provide a query that is off by a year or two in a birth year or that mixes up a middle name for a first name.

In 424, the search module 412 expands the characteristics into a more extensive set of features that are derived from the characteristics specified in the user query. Besides the noise in the query, the data content stored in the databases 414 (shown in FIG. 4A) may also be noisy, as explained above. Because of the noise in both the queries and content, a certain amount of fuzziness is allowed to achieve acceptable return of search result. As such, in one embodiment, the search is conducted based on genealogical features derived from the exact characteristics specified in the query. Here, a feature means rules of variations of the specified characteristics. For example, features can include the specified characteristic, a variation of the specified characteristic, or a generalization of the specified characteristic. A specified characteristic means the exact characteristic specified by the user in the query. For example, a name (i.e. a characteristic) specified in the query is expanded to multiple search features including the exact specified name, a similar or related name, a phonetic phase, a married surname, and strings that are derived by fizzy operations of the specified string of name, etc. Additional name features may also be generated such as by exchanging the first name and the middle name. A place (i.e. another characteristics) specified in the query is expanded to multiple search features including the exact specified place, a general area (e.g., state instead of city), adjacent place (e.g. Oklahoma instead of Texas), etc. Also, dates are expanded by days, months, and within a certain number of years.

A sub-module of the search module 412, such as a query expansion module, translates the specified characteristics in the query into a more extensive set of search clauses based on the features of the specified characteristics. For example, a search of the name "John" results in a first search clause that searches for "John", a second search clause that searches for "Jon", a third search clause that searches for "Johnny", etc. Such search expansion operation may likewise apply to a variety of life events (birth, death, marriage, residence, etc.) and people (self, spouse, parents, children, etc.).

After the expanded set of search clauses are generated, in 426 the search module 412 conducts search of the genealogical databases in accordance with the set of search clauses to identify multiple genealogical records based on the features. In 428, the search module 412 selects top search records. In one embodiment, the top search records are selected based on the number of search clauses that a record satisfy. In another embodiment, the search clauses are first grouped by kinds (e.g. all variations of first name is grouped as one kind). The top search records are selected based on the number of kinds of search clauses that a record satisfy.

Figure 4C:
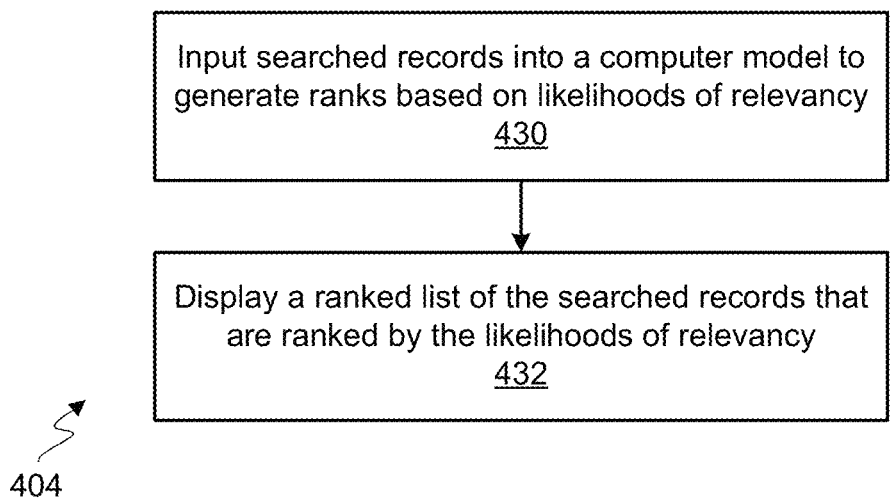
FIG. 4C is a flowchart depicting a rank phase performed by a query system, in accordance with an embodiment.

FIG. 4C is a flowchart illustrating the rank phase 404, in accordance with an embodiment. The rank phase 404 may begin when the rank model 418 receives the top searched records from the search module 412 generated in the search phase 402. In 430, the genealogical records identified in the search phase 402 are input into the rank model 418 trained to rank the genealogical records based on likelihoods of the genealogical records being relevant to the user query. For example, the likelihoods may be quantified by relevancy scores. In one embodiment, the relevancy score of each record is determined by a sum of the record's matched features scaled by the features' associated weight factors (or simply referred as weights).

Different weights are assigned to different features because a searched record may include one or more matched features that are of different importance in terms of relevancy. For example, a query may specify "John Smith who died in 1957." In response, a record of a person "John Smith" who died in 1958 may be selected by the search module 412 because the feature "John" (derived from the query specifying exactly "John") and the feature "1958" (derived from the query specifying year of death equals to 1957) match the query. It should be note that a single query may yield multiple potential search clauses with associated with features that have different levels of importance. For example, a specified characteristic of year of death being equal to 1957 may yield a first search clause of 1956, a second search clause of 1957, and a third search clause of 1958. A feature (e.g. a record having a year of death being 1957) matching the search clause of 1957 is likely more important than other year-of-death features because such feature is an exact match of the specified characteristics in the query.

As such, each of the matched features in each record is assigned with a different associated weight in computing the relevancy score. The associated weight determines how much that feature contributes to the overall relevancy score of the record. The relevancy score of each record is determined based on the features scaled by weights. In some embodiments, the relevancy score is computed as a linear or nonlinear combination of features and weights. In one specific case, the relevancy score is computed by the equation (1) specified below.

$$\text{Relevancy score, } s = \sum_{i=0}^{n} f_i \times w_i \qquad \text{Eq. (1)}$$

In the above equation (1), $f_i$ is the i-th feature and $w_i$ is the weight of the i-th feature. There are n matched features for a record.

In 432, the rank model 418 displays a ranked list of searched records that are ranked by the likelihoods of relevancy. For example, the rank is determined by the descending order of the relevancy scores.

Generation of Training Set

Figure 5:
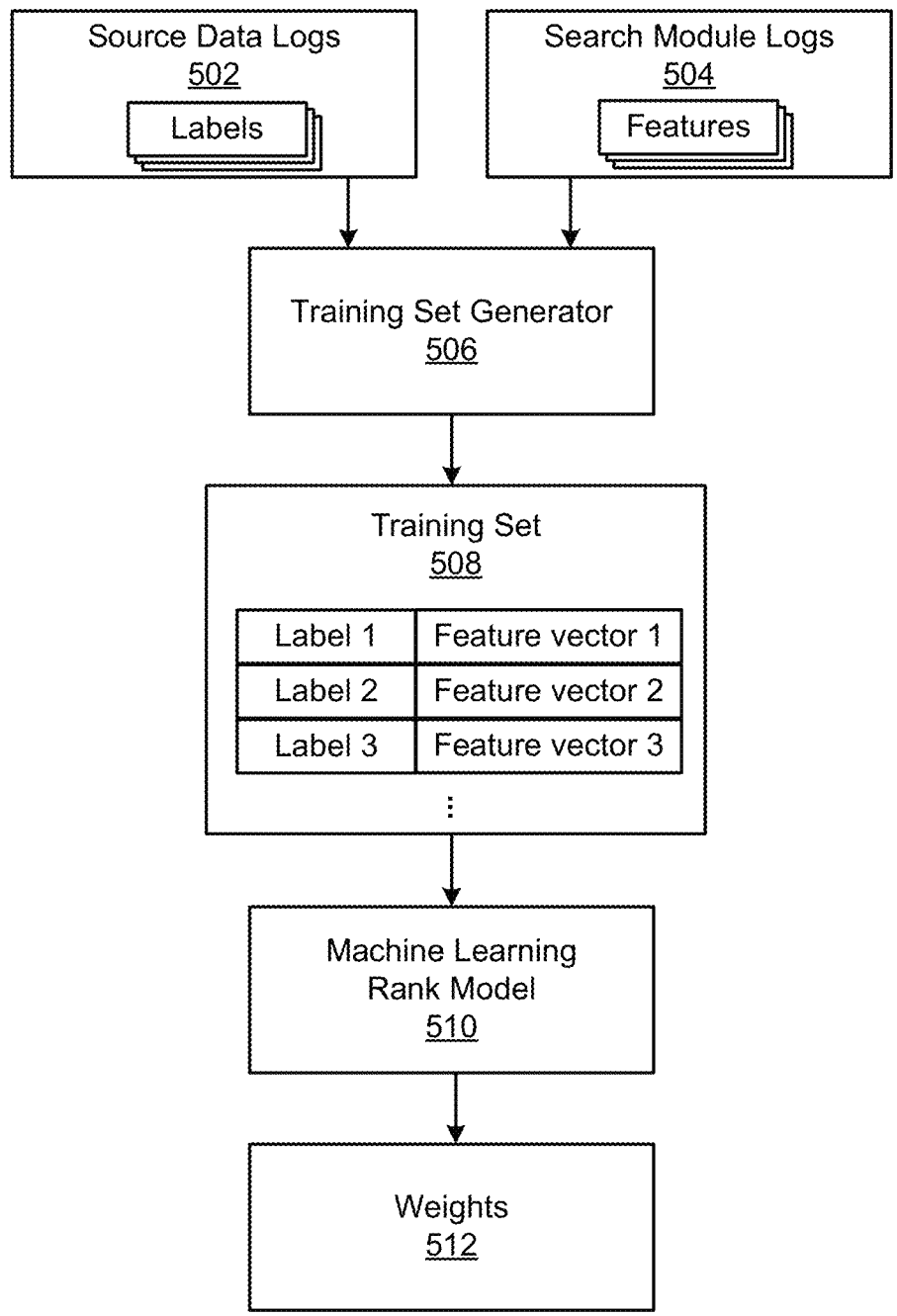
FIG. 5 is a block diagram illustrating a training process of a machine learning rank model, in accordance with an embodiment.

FIG. 5 is a block diagram 500 illustrating a training process of a machine learning rank model, in accordance with an embodiment. Source data logs 502 are collected based on user actions. For example, the source data logs 502 specific whether, for a particular record, the user took any action (e.g., save or print a particular record) that may indicate the record is relevant. Whether the record is relevant is a label for the record. Search module logs 504 are also collected. The search module logs 504 include query information that provides a list of features that are matched with past queries.

The source data logs 502 and the search module logs 504 are combined to generate a training set 508 by a training set generator 506. The training set 508 includes features and labels that are based on past queries and past user actions. When a query is executed, the searched records may be samples in the training set 508. Each past record has an associated set of features on which the query and the past record has a match. For example, the query specifying "John Smith born May 1990" may returns the following three top records:

r1: John Smith born May 1900
r2: Johnny Smith born 1900
r3: Bob Smith born 1888

The corresponding training set may contain the following features for those records:

r1: SelfGivenName exact, SelfGivenName phonetic, SelfGivenName fuzzy1, SelfGivenName fuzzy2, SelfSurname exact, SelfSurName phonetic, SelfSurname fuzzy1, SelfSurname fuzzy2, SelfBirthDate month, SelfBirthDate year r2: Johnny Smith born 1900: SelfGivenName phonetic, SelfGivenName similar, SelfGivenName fuzzy2, SelfSurname exact, SelfSurName phonetic, SelfSurname fuzzy1, SelfSurname fuzzy2, SelfBirthDate year r3: Bob Smith born 1888: SelfSurname exact, SelfSurName phonetic, SelfSurname fuzzy1, SelfSurname fuzzy2, SelfBirthDate_-2

For example, record r2 contains features such as SelfGivenName phonetic, SelfGivenName similar, and SelfGivenName fuzzy2. This is because the given name in the query and this record, John and Johnny, are phonetic matched, similar, and fuzzily matched within the edit distance of 2. However, the record does not include SelfGivenName exact, as the two given names do not match exactly.

Each record may then be represented by a vector that includes representative values of a list of features. A feature list can be a union of all possible features in the searched records. For example, the feature list based on the records r1, r2, and r3 is: [SelfGivenName exact, SelfGivenName phonetic, SelfGivenName fuzzy1, SelfGivenName fuzzy2, SelfSurname exact, SelfSurName phonetic, SelfSurname fuzzy1, SelfSurname fuzzy2, SelfBirthDate month, SelfBirthDate year, SelfGivenName similar, Self-BirthDate_-2].

The representative value of each feature in a vector of a record is either 1 or 0, which indicates whether the record has the feature in the feature list. In the example using records r1, r2, and r3, a feature vector for each record will be 12 binary values either 0 or 1, depending on whether the feature in the feature list is present in that record. Based on the determine, the vectors corresponding to the records r1, r2, and r3 are the following:

r1: [1, 1, 1, 1, 1, 1, 1, 1, 1, 1, 0, 0]
r2: [0, 1, 0, 1, 1, 1, 1, 1, 0, 1, 1, 0]
r3: [0, 0, 0, 0, 1, 1, 1, 1, 0, 0, 0, 1]

Take the feature vector in the second record, r2, as an example. The first entry is 0 because the feature in the feature name list, SelfGivenName exact, is not present in r2. The second entry is 1, as the corresponding feature name, SelfGivenName phonetic, is present in r2.

Based on user actions, labels are extracted for each record. In one embodiment, the labels are binary data which indicates a record is relevant or irrelevant. A record is relevant if a user took an action (e.g. printed or saved) associated with the record. Otherwise, the record is labeled as irrelevant. A relevant record is labeled as 1 while an irrelevant record is labeled as 0. The training set 508 includes both the feature vectors and the corresponding label.

For example, a training set 508 that has labels and features in the example using records r1, r2, and r3 can be represented as the following:

r1: 13638972199:1030:54268543 13144419:8781 1.146585 1 {"SelfGivenName exact":1, "SelfGivenName phonetic":1, "SelfGivenName fuzzy1":1, "SelfGivenName fuzzy2":1, "SelfSur name exact":1, "SelfSurname phonetic":1, "SelfSurname fuzzy 1":1, "SelfSurname fuzzy2":1, "SelfBirthDate month":1, "SelfBirth-Date year":1} r2: 13638972199:1030:54268543 12880567:8781 1.063842 0 {"SelfGivenName phonetic":1, "SelfGivenName similar":1, "SelfGivenName fuzzy2":1, "SelfSurname exact":1, "SelfSurnam e phonetic":1, "SelfSurname fuzzy1":1, "SelfSurname fuzzy2":1, "SelfBirthDate year":1} r3: 32551162070:1030:86856321 17544067:8784 1.326341 1 {"SelfSurname exact":1, "SelfSurname phonetic":1, "SelfSurname fuzzy1":1, "SelfSurname fuzzy2":1, "SelfBirthDate-2":1}

Take the record r1 as an example. The first entry, such 13638972199:1030:54268543, is the query identifier. The second id, such as 13144419:8781, is the returned record identifier corresponding to that query. The third entry, like 1.146585, is the manual score for each record. This generates a ranking determined by the descending order of the manual scores. Even though the manual score may not be used for machine learning models, the manual score gives a baseline ranking against which the results of machine learning models are compared. The fourth entry, like 1, is the relevancy label for that record. The last entry, is the feature names whose values are 1. It should be noted that the first two records belong to a query, and the third record belongs to another query. For a given query, the query could return hundreds of records. In one embodiment, ranking is performed for all the records returned by the same query instead of mixed records among various queries.

The training set 508 may be transformed to the following data format by calculating the binary feature vector and extracting the label information. For example, records r1, r2, and r3 can be represented in a form of one or more feature vectors as the following:

r1: 1 qid:1 1:1 2:1 3:1 4:1 5:1 6:1 7:1 8:1 9:1 10:1 11:0 12:0
r2: 0 qid:1 1:0 2:1 3:0 4:1 5:1 6:1 7:1 8:1 9:0 10:1 11:1 12:0
r3: 1 qid:2 1:0 2:0 3:0 4:0 5:1 6:1 7:1 8:1 9:0 10:0 11:0 12:1

The first entry is the relevancy label for each record. The second entry is the queryID represented as integers. The exact value, like 13638972199:1030:54268543, is not needed to represent a query, as the purpose is to tell whether two records are returned by the same query or not. Starting from the third entry, the pair of values represent the value of a certain feature. For example, 2:1 means that the second feature has value 1. Such data format may be the input data for the machine learning rank model 510, which then outputs weights 512 for features.

The machine learning rank model 510 may use different ranking and machine learning models to rank the records. In some embodiments, the rank model may use a pointwise model such as logistic regression, random forest, and SVM. A pointwise method assumes that each query-record pair in the training data has a numerical or ordinal score. Then the ranking problem can be approximated by a regression problem. Given a single query-record pair, a score is predicted. Ordinal regression and classification algorithms can also be used in pointwise approach when such algorithms are used to predict score of a single query-record pair, and it takes a small, finite number of values.

In other embodiments, the rank model may use a pairwise model such as RankSVM, Rankboost, and RankNet. A pairwise method takes into account that relevancy is query dependent. In a pairwise method relevancy is no longer absolute and ranking becomes the classification on document pairs with respect to the same query. While pairwise method generally outperforms pointwise method, there may be significant shortcoming related to the identical treatment of pairwise errors at all positions. Clearly, pairwise errors at the top should trigger higher penalties. Another shortcoming of pointwise and pairwise methods is that they do not directly optimize the metric used to evaluate relevance ranking performance.

In yet other embodiments, the rank model may use a listwise model such as Coordinate Ascent (CA), AdaRank, LambdaMART, and ListNet. These methods perform learning directly on document lists and treat ranked lists as learning instances. These methods try to directly optimize the evaluation measures, averaged over all queries in the training data. In some cases, the use of listwise model could be difficult because most evaluation measures are not continuous functions with respect to ranking model's parameters. Hence, continuous approximations or bounds on evaluation measures may be used.

Coordinate Ascent (CA) Model

Coordinate ascent (CA), similar to coordinate descent, is an optimization algorithm to find a local minimum or maximum of an objective function. CA model can be used in the machine learning rank model 510. CA is an algorithm that could deal with non-continuous objective functions. During each alteration CA alternatively updates a variable by a step size along a certain direction that leads to the local minimum or maximum of the objective function. CA has a similar convergence property as gradient descent. However, a difference between CA and gradient descent is that CA is a derivative-free optimization algorithm. That is to say, CA could optimize an objective function for which the derivative information is not available. However, one drawback of CA is that CA could take a long time to converge because CA alternatively updates each variable by a tiny step size and repeats the iteration until the objective function does not change anymore.

Given the following minimization problem in terms of the variable x, $$\underset{x}{\text{minimize}} f(x)$$

CA begins with an initial guess $x_0$ and does a line search along each iteration. This will generate a sequence $x_0, x_1, \ldots$ so that the objective function decreases with each iteration. It will have the following property:

$$f(x_0) \geq f(x_1) \geq f(x_2) \geq \ldots$$

In the machine learning rank model 510, a goal of a training process is to find optimal weights in order to maximize or minimize a ranking performance metric of the machine learning rank model 510. A ranking performance metric is a parameter that measures the performance of the machine learning model. In one embodiment, an example ranking performance metric is an averaged normalized discounted cumulative gain (NDCG) score in the objective function. The optimization problem is stated as follows:

$$\underset{w}{\text{maximize}} f(w)$$

where f(w) is the NDCG score determined by the weights.

Before NDCG is determined, DCG (Discounted Cumulative Gain) is defined by Equation (2) as follows:

$$DCG = \sum_{i=1}^{n} \frac{2^{rel_i} - 1}{\log_2(i+1)} \qquad \text{Eq. (2)}$$

where n is the number of records in the ranking, i is the position of the i-th record, and $rel_i$ is the relevancy label value of the record, represented as 1 or 0. To eliminate the dependency on n, the score is further normalized by ideal DCG (IDCG), which is the DCG score corresponding to the optimal ranking by relevance score. For example, for a given query that returns 35 relevant records and 65 irrelevant records, the ideal DCG would be the DCG calculated using $rel_i$ equals to 1 for the first 35 records and $rel_i$ equals to 0 for the rest of 65 records using the DCG formula specified in Equation (2) above. Other ways to determine IDCG is also possible. The normalized DCG, NDCG, is computed by the Equation (3) below:

$$NDCG = \frac{DCG}{IDCG} \qquad \text{Eq. (3)}$$

The NDCG score of the output of the objective function, f(w), is determined by the weights because the discontinue factor in determining DCG is based on the rank, which is determined in accordance with the weights. To elaborate, NDCG is determined by position of each record and its relevancy label. The relevance label of each record is fixed, while the position is determined by the ranking, which is decided by the descending order of the score of each record. As listed in equation (1), the relevancy score of each record depends on weights and feature values, in which feature values are fixed. Thus weight is the only variable that affects NDCG. f(w) is not differentiable in terms of w, which could be shown by the reasoning procedure. Thus CA, as a derivative-free optimization algorithm, is one of few optimization algorithms that could optimize this non-differentiable objective function.

Training and Optimization of Ranking Performance Metric

FIG. 6A shows exemplary pseudo-codes of a learning process that determines the appropriate weights for the features in performing ranking determination, in accordance with an embodiment. The codes represents an algorithm that first initializes weights to some real numbers. Then for each feature, CA updates the feature's weight by either increasing the value by a step size or decreasing it by that step size. There might be some iterations along each direction. In one embodiment, if the ranking performance metric (e.g. NDCG) is improved in one direction, then the algorithm will not try the other direction. The procedure is terminated when convergence is reached. CA has similar convergence properties as gradient descent. There are two parameters marked in red in the default CA: n_iterations and tolerance. The first one determines the number of iterations a weight is updated along a certain direction. The second one is the stopping criteria. In accordance with some embodiment, to increase the convergence speed and the computation speed of the machine learning model, the weight initialization and/or stepsize are changed.

Figure 6B:
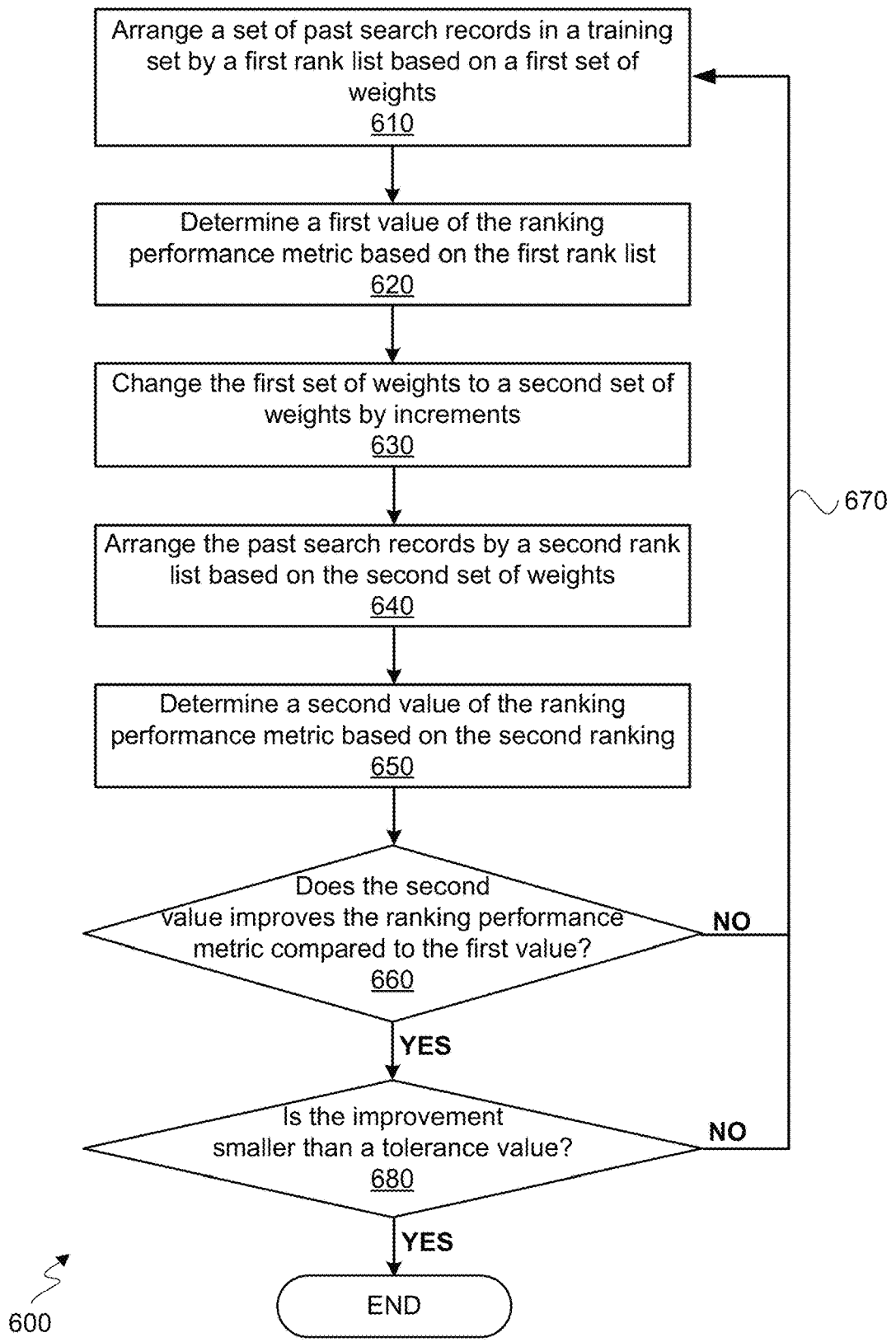
FIG. 6B is a flowchart depicting an iteration process in optimizing a ranking performance metric of a machine learning model, in accordance with an embodiment.

FIG. 6B is a flowchart depicting an iteration process 600 in optimizing the ranking performance metric of a machine learning model, in accordance with an embodiment. The iteration process 600 iteratively adjusts the weights of the genealogical features specified in a training set (e.g. specified in one or more feature vectors in the training set) to optimize the ranking performance metric of the machine learning model. In discussing with FIG. 6B, NDCG is used as an example of the ranking performance metric, but it should be understood that the ranking performance metric may be any other suitable parameters.

In 610, the machine learning model arranges a set of past search records in the training set by a first rank list based on a first set of weights corresponding to features such as genealogical features identified in the training set. For example, in one example training set, there can be three features. In such case, the first set of weights may be a set of three values [0.35, 0.25, 0.4] with each value being the weight corresponding to each feature. The first rank list of the past search records can be determined based on the relevancy score of each past search record, as calculated using Equation (1) or other similar computations. The first set of weights may be an initial set of weights that are specified to increase the convergence speed of the machine learning model in a manner that will be discussed in more details below. In 620, the machine learning model determines a first value of the ranking performance metric based on the first rank list. For example, when NDCG is used as the ranking performance metric, the NDCG value may be computed using Equations (2) and (3) based on the first rank list.

In 630, the machine learning model changes the first set of weights to a second set of weights through changing each weight in the first set by an increment. The size of the increment may be an arbitrary increment or may be a specific increment that is used to increase the convergence speed of the training process. The determination of the specific increment will be discussed in further detail below. It should be noted that the direction of change (e.g. increase or decrease) for each weight in the set can be different (i.e. some increasing and some decreasing). The machine learning model may use a CA algorithm to determine the direction of a given increment of change. In 640, the machine learning model arranges the past search records in the training set by a second rank list based on the second set of weights. In 650, the machine learning model determines a second value of the ranking performance metric based on the second ranking.

In decision stage 660, the machine learning model compares the second value of the ranking performance to the first value of the ranking performance to determine whether the second value improves the ranking performance metric (i.e. increases the metric in case of searching for a maximum or decreases the metric in case of searching for a minimum). If the second value fails to improve the ranking performance metric, the process in 610-650 are iteratively repeated (as indicated by arrow 670) by changing the directions of the incremental changes and using the second value of a previous round as the first value. If in decision stage 660 it is determined that the second value improves the ranking performance metric, the process 600 moves on to decision stage 680, in which the improvement is compared to a tolerance value specified. If the improvement is larger than the tolerance value, the process in 610-650 are repeated by generally following the directions of the incremental changes of the last round. If the improvement is smaller than the tolerance value, this indicates that the machine learning model has achieved convergence and the model has been trained. A machine learning model is converged when the iterations result in the performance metric getting closer and closer to a value. For example, a model's convergence occurs when the performance metric achieves a maximum and a minimum and further iterations do not result in an increase (in case of a maximum) of the value of the performance metric beyond the tolerance value specified.

Improvements on Convergence Speed

A machine learning model based on CA could take a long time to achieve a convergence because the model might need a huge number of iterations. Each iteration alternatively updates a weight by an increment size and repeats the iteration until the objective function does not change anymore. The speed of the convergence of a training process may be increased by (1) changing a weight initialization scheme, and/or (2) changing increment size for each round of weight update in the iteration process.

In one embodiment, the weights are normalized to a scale in the range of 0 to 1. For example, each weight is divided by the sum of all weights. The normalized weights will lead to the same ranking because the score of each record of iteration, which in one case is a linear combination of features and weights, is divided by the sum of all weights. As such, the relative order of scores is not changed because each score is normalized by the same factor. Thus, the ranking, which may be determined by the descending order of scores, is not affected by a normalization process. Because of the normalization process, each of the weights is limited as positive weights. A search space with both positive and negative weights is usually difficult to manage, while a positive search space can potentially be used to implement more efficient estimation techniques. For simplicity, the process of changing the weight initialization scheme is discussed with the normalized scale, but it should be understood that the weights do not always have to be normalized in order to use the initialization scheme described herein to speed up the convergence speed.

In one case, an initial weight for each feature may be assigned with a same initial weight between 0 and 1. For example, each value may equally be 1 divided by the number of features. However, this equal-initial-weight approach could make the machine learning model difficult to converge. In one embodiment, different weights are assigned to different features in an initial set of weights used in training the machine learning model. The initial weights may be expectation values of the relevancy weights of the features based on the past search records in the training set. Expectation values are used to increase the convergence speed of the machine learning model. If a feature is present in many relevant past search records, it would be preferred to assign a high weight to this feature. This will generate a high relevancy score for the relevant record without affecting the score of irrelevant records. In this way the relevant record will be ranked on top of the list even in early rounds of the iteration process 600.

The expectation values used for the initial weights of the features may be determined by any suitable ways. In one embodiment, an expectation value is the statistical expected value E[X]. In another embodiment, an expectation value associated with a corresponding feature is determined based on a ratio of the frequency of the feature being present in relevant past search records to a total number of records associated with the feature. For example, the expectation value in the range of 0 and 1 to each feature can be determined by Equation (4) as follows:

$$w = \begin{cases} 0.5, & \text{if } fre_{rel} = 0, fre\_irrel = 0 \\ \dfrac{fre\_rel}{fre_{rel} + fre\_irrel} & \text{otherwise} \end{cases} \quad \text{Eq. (4)}$$

In the Equation (4) above, fre_rel is the frequency of a feature being present in relevant past search records, and fre_irrel is that frequency of the feature being present in irrelevant past search records. FIG. 7A illustrates a feature distribution in an example small training data. The record column specifies past search records. The label column is the relevancy labels. The rightmost four columns specify whether a feature is present in a past search record. The frequency and weight of each feature can then be calculated, as indicated in FIG. 7B. For example, $f_3$ is 1 in relevant records for 2 times, and is 1 in irrelevant records for 1 time, thus the initial weight is 2/(2+1), which is ⅔. Thus, a weight list for each feature is determined as 1, 0, 0.67, and 0.5 respectively. For comparison, the weights obtained by an equal-initial-weight assignment would be 1 divided by the number of features, i.e., ¼ for each feature.

Given the initial weights, the score for each record is calculated based on the feature value in FIG. 7A. Specifically, score may be calculated as the linear combination of features and weights. FIG. 7C shows the score for each record. $s_{new}$ and $s_{old}$ stands for the score obtained by using expectation values as initial weights and the score obtained by using an equal-initial-weight assignment respectively. Given the score for each record, the rank could be obtained by the descending order of the score. $rank_{new}$ is the rank obtained by using expectation values as initial weights. $rank_{old1}$ and $rank_{old2}$ are the two rankings given by using an equal-initial-weight assignment, as the scores for records $r_2$ and $r_3$ are the same. The use of expectation values as initial weights gives the optimal rank by ranking both relevant records on the top, and irrelevant ones at the bottom. However, either $rank_{old1}$ or $rank_{old2}$ ranks an irrelevant record, say, r3, at a higher position than a relevant record, r1. This example shows how using expectation values as initial weights could help ranking by assigning different weights according to the feature distribution in labels. In turn, the convergence speed of the training process can be increased significantly.

Alternatively or additionally to changing the weight initialization scheme, the size of the incremental changes may also be adjusted to increase the speed of convergence. In one embodiment, the size of each increment is determined based on a sensitivity of the ranking performance metric relative to the size of each increment.

| # of records | # of features | sample weight |
|---|---|---|
| 6202 | 72 | 0.021354935377557952 |

Figure 8:
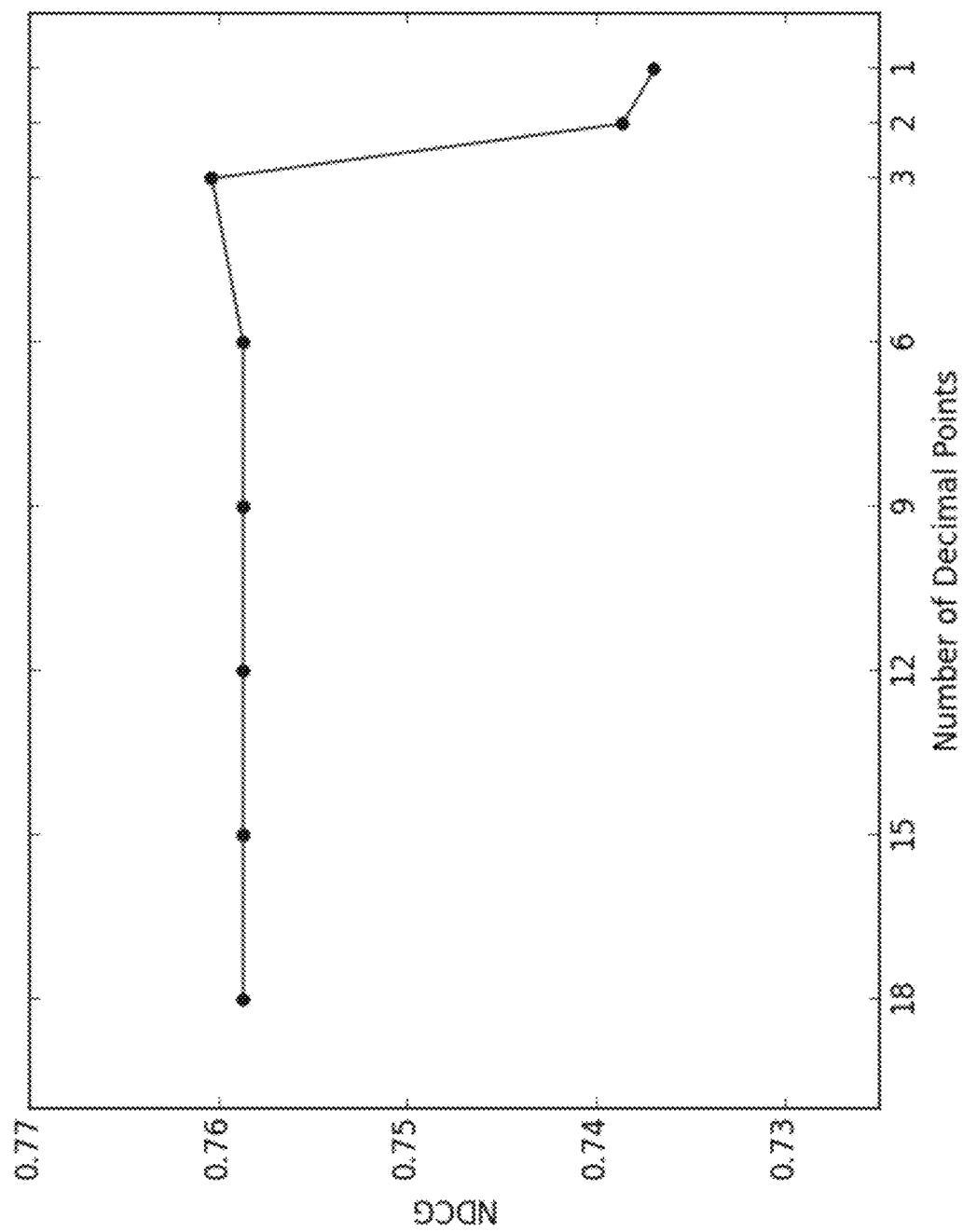
FIG. 8 is a plot illustrating the sensitivity of NDCG in relative to number of decimal points of weights, in accordance with an embodiment.

The table above provides an example that lists the number of samples and features in the data, and a weight value for a certain feature. In an experiment, the test data is 10% of birth records. This weight list is determined by including the remaining 90% of the data, which includes 51462 records. The weight list is determined by a machine learning model that uses an equal-initial-weight assignment instead of expectation values, as the goal of this experiment is to see how NDCG is sensitive to the weights learned by the machine learning model. FIG. 8 shows the relationship of NDCG and number of decimal points. The experiment is conducted by using a list of weights that have 18 decimal points, then the weights are rounded to different number of decimal points to see how such rounding affects NDCG. It shows that NDCG is similar when the number of decimal points decreases from 18 to 3. However, it has an obvious drop when the weight is rounded to only 2 decimal points.

Based on such sensitivity determination of the ranking performance metric relative to the size of each increment, a size for each incremental change in each round of iteration that optimizes the convergence speed of the process 600 can be determined. In one embodiment, the size of each incremental change is set to 0.01 in a normalized scale between 0 and 1 so that one round of weight change can lead to a more obvious change in the objective function. The value 0.01 is chosen based on the sensitivity of the ranking performance metric. NDCG is sensitive to two decimal points of the weights. The experiment illustrated by FIG. 8 indicates that it is reasonable to update the weight by 0.01 instead of 0.001 during each iteration.

Figure 9:
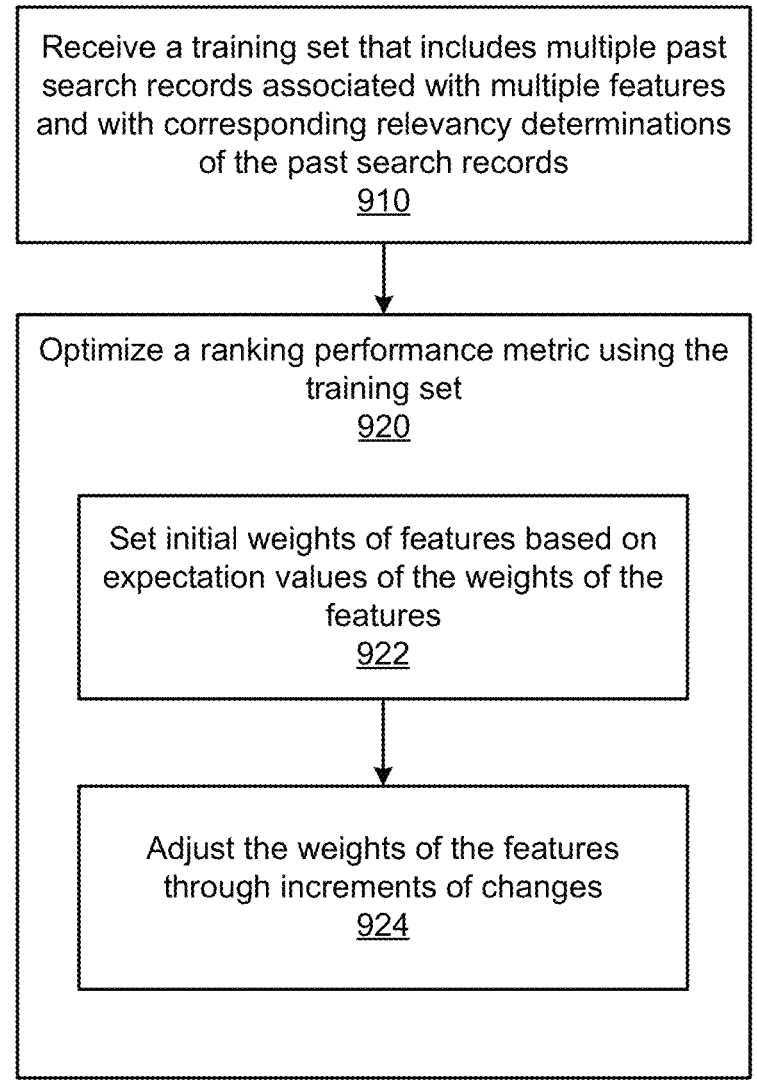
FIG. 9 is a flowchart depicting a method for training and increasing a convergence speed of a machine learning model, in accordance with an embodiment.

FIG. 9 is a flowchart depicting a method 900 for training and increasing a convergence speed of a computer model that is capable of ranking multiple records based on relevancy, in accordance with an embodiment. In 910, the computer model receives a training set. The training set includes multiple past search records associated with multiple features and with corresponding relevancy determinations of the past search records determined based on past user actions associated with the past search records. The generation of such training set is described in detail above with FIG. 5. In 920, the computer model optimizes a ranking performance metric of the computer model using the training set. The ranking performance metric is determined based on based on a relevancy ranking of the past search records in accordance with weights of the features. The process of optimizing of the ranking performance metric may include 922 and 924. In 922, the computer model sets initial weights of the features based on expectation values of the weights of the features. The expectation values are determined based on past search records. In 924, the computer model adjusts the weights of the features through increments of changes to optimize the ranking performance metric. The size of each increment is determined based on a sensitivity of the ranking performance metric relative to the size of each increment.

It is important to note that while the training processes and ranking processes in this disclosure are mainly described in associated with genealogical query, the training processes and ranking processes can have broader applications on other different technological fields. For example, the training processes that can increase the convergence speed of a machine learning model can be applied to other ranking model in other database searches. Those processes are not limited to genealogical queries of a genealogical index.

Experiments

Two experiments are conducted on several different record types. The first experiment explores the relationship of tolerance value and running time. The second one explores the relationship of NDCG and tolerance value. The experiment is conducted on several different types of record data, including birth, marriage, and death.

Figure 10:
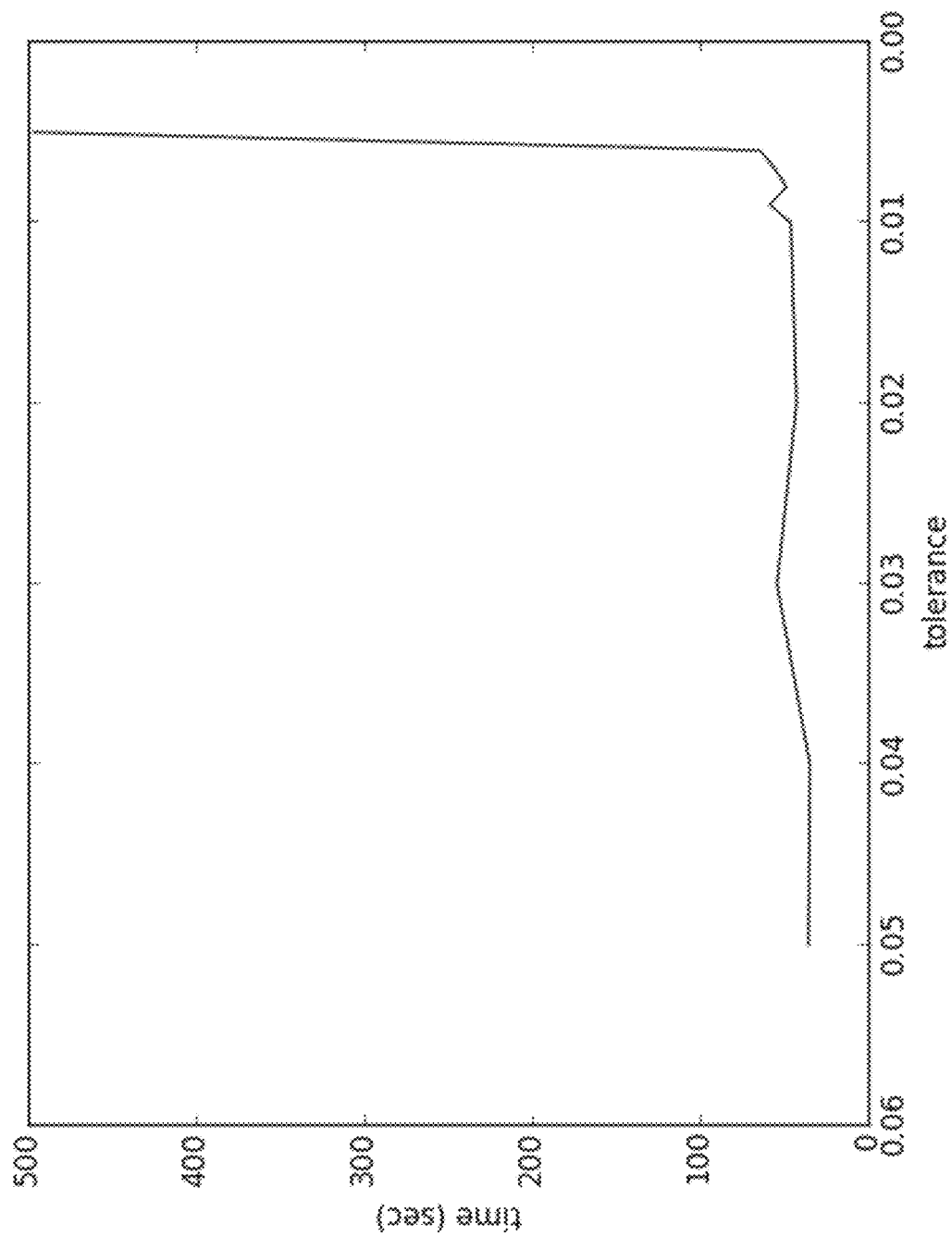
FIG. 10 illustrates the relationship of tolerance value and running time of a machine learning model until convergence, in accordance with an embodiment.

FIG. 10 illustrates the relationship of tolerance value and running time until convergence, in accordance with an embodiment. The running time is similar when the tolerance value decreases from 0.05 to 0.01. However, there is an obvious increase in the running time when the tolerance value is decreased to 0.005. The running time could be 10 times slower. This observation is in line with the procedure of training a computer model as described in FIGS. 6A and 6B. The training process is forced to repeat more times with a smaller tolerance value. Thus a tiny tolerance value will eventually result in a long running time.

Figure 11:
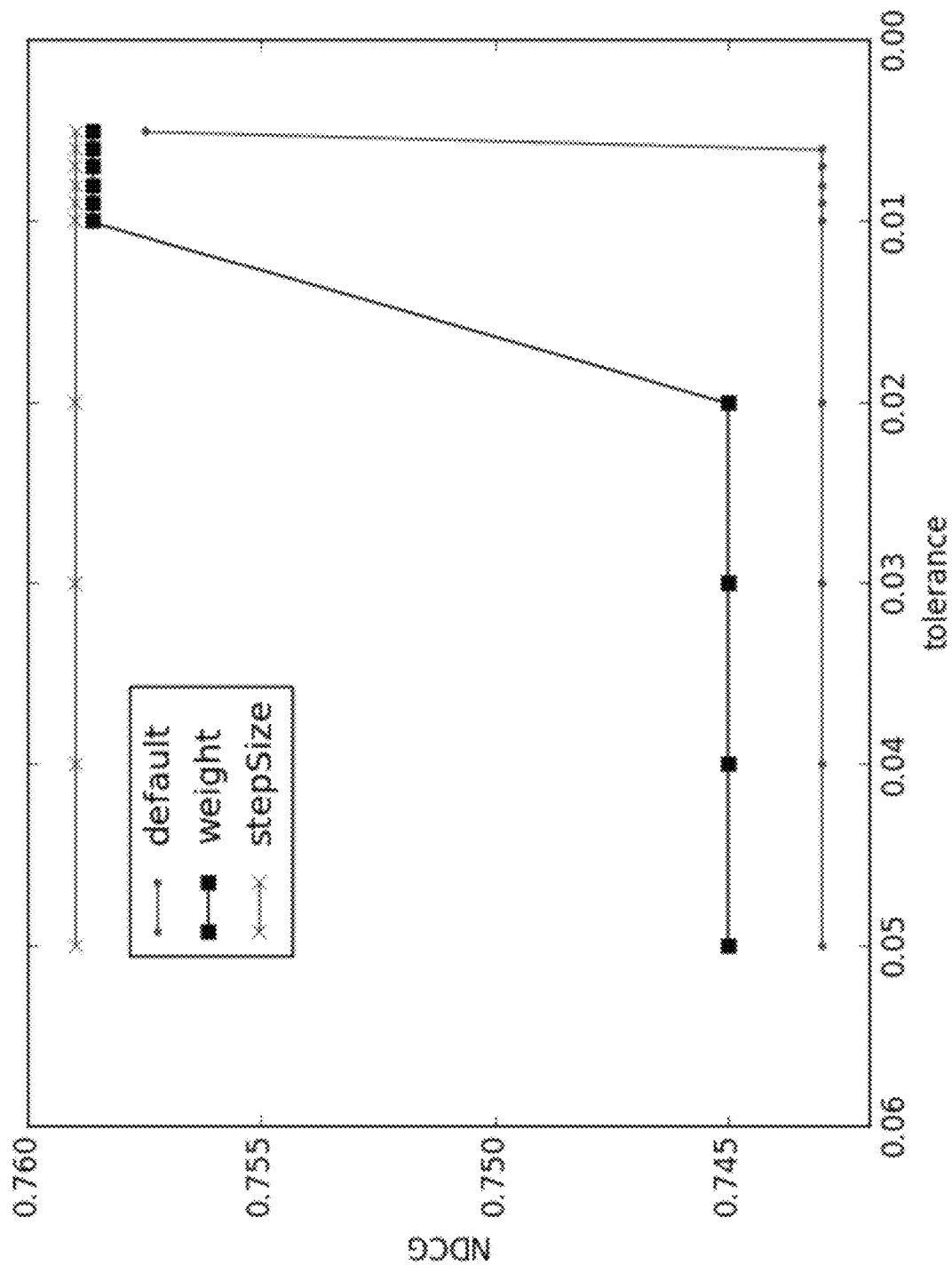
FIG. 11 illustrates the convergence speeds of different machine learning algorithms, in accordance with an embodiment.

In a second experiment, the effect of tolerance value to the ranking performance is explored. A subset of samples is used as the training data from which different training processes applied respectively with certain tolerance value to generate weights. Then the weights are applied to rank the remaining samples and evaluate the ranking performance by NDCG. The experiment is conducted using three different training algorithms and the result is shown in FIG. 11. The first algorithm uses an equal-initial-weight assignment with no change in the size of incremental changes (denoted as "default"). The second algorithm uses a weight initialization scheme based on expectation values of the weights (denoted as "weight"). The third algorithm changes only in the size of the incremental changes (denoted as "stepsize").

Few conclusions may be drawn from FIG. 11. First, the performance of all three algorithm becomes better when tolerance value becomes smaller. Second, the best performance that each algorithm could reach is very similar. The best NDCG score is between 0.75 to 0.76, with the difference less than 0.01. The default algorithm reaches the best performance when tolerance value is decreased to 0.005, while the other two algorithms have similar performance with a much bigger tolerance value, which is 0.01 for the weight algorithm and 0.05 for the stepsize algorithm. FIG. 10 shows that a smaller tolerance value indicates a longer running time, especially when the tolerance value is decreased to 0.005, the running time could be 10 times slower. Thus, a conclusion drawn from FIG. 10 is that the weight algorithm and the stepsize algorithm has similar ranking performance as the default algorithm but takes much less time.

The two experiments show that using a specific initial set of weights and determining a specific size of incremental change will increase the speed of convergence. In one case, the machine learning model can converge ten times faster while maintaining the same ranking performance. The speed up in the training process can allow faster iteration with research on new training data, new feature set, new partitioning scheme, etc.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for searching database records, the computer-implemented method comprising:
receiving a user query that specifies one or more characteristics;
creating multiple features derived from the characteristics specified in the user query;
identifying multiple records in a database based on the features;
inputting the records identified into a computer model trained to rank the records based on likelihoods of the records being relevant to the user query, wherein (i) the computer model comprises relevancy weights for the features, and (ii) the computer model is trained by a training using a set of initial weights that are expectation values of the relevancy weights of the features to increase a speed of convergence of the training, wherein the training further comprises adjusting a ranking performance metric of the computer model via adjusting the relevancy weights through increments of changes, and a size of the increments is determined based on a sensitivity of the ranking performance metric relative to the size of the increments; and providing a ranked list of records in response to the user query.

2. The computer-implemented method of claim 1, wherein the ranking performance metric is determined based on discounted cumulative gain.

3. The computer-implemented method of claim 1, wherein the size of the increments is in an order of two decimal points on a scale that normalizes the relevancy weights between 0 and 1.

4. The computer-implemented method of claim 1, wherein one of the expectation values associated with a corresponding feature is determined based on a ratio of a frequency of the corresponding feature being present in past relevant search results to a total number of past search records associated with the corresponding feature.

5. The computer-implemented method of claim 1, wherein one of the characteristics specified in the user query generates two or more features.

6. The computer-implemented method of claim 1, wherein at least some of the features are derived from a fuzzy operation of a string of one of the characteristics specified in the user query.

7. The computer-implemented method of claim 1, wherein one of the likelihoods of relevancy of one of the identified records is determined by a combination of features present in the one of the identified records scaled by the relevant weights corresponding to the features.

8. The computer-implemented method of claim 1, wherein the identified records are selected based on at least one of the following (i) the number of features the records match, and (ii) the number of groups of features the records match.

9. A computer-implemented method for training and increasing a convergence speed of a computer model that is capable of ranking multiple records based on relevancy, the computer-implemented method comprising:

receiving a training set for the computer model, the training set comprising multiple past search records associated with multiple features and with corresponding relevancy determinations of the past search records determined based on past user actions associated with the past search records; and adjusting a ranking performance metric of the computer model using the training set, wherein the ranking performance metric is determined based on a relevancy ranking of the past search records in accordance with weights of the features, wherein the adjusting of the ranking performance metric comprises:

(i) setting initial weights of the features based on expectation values of the weights of the features, the expectation values being determined based on the past search records, and (ii) adjusting the weights of the features through increments of changes to adjust the ranking performance metric, wherein a size of each increment is determined based on a sensitivity of the ranking performance metric relative to the size of each increment.

10. The computer-implemented method of claim 9, wherein the relevancy determinations are binary values with a first binary value associated with relevant past search records and a second binary value associated with irrelevant past search records.

11. The computer-implemented method of claim 9, wherein the relevancy determinations of the past search records based on the past user actions associated with the past search records comprises:

determining a past search record as relevant in response to a data log of the past user actions indicating that a user performed a save or print operation associated with the past search record, and otherwise, determining the past search record as irrelevant.

12. The computer-implemented method of claim 9, wherein the training set is represented in a form of one or more feature vectors.

13. The computer-implemented method of claim 9, wherein the computer model uses a coordinate ascent algorithm to determine a direction of a given increment of change.

14. The computer-implemented method of claim 9, wherein adjusting the weights of the features through increments of changes to adjust the ranking performance metric comprises:

arranging the past search records by a first rank list based on a first set of weights corresponding to the features, determining a first value of the ranking performance metric based on the first rank list, changing the first set of weights to a second set of weights through changing each weight in the first set by the size of each increment, arranging the past search records by a second rank list based on the second set of weights, determining a second value of the ranking performance metric based on the second ranking, and comparing the second value to the first value.

15. The computer-implemented method of claim 14, wherein the determining of the first value of the ranking performance metric is based on determining a discounted cumulative gain of the first ranking.

16. The computer-implemented method of claim 9, wherein each of the expectation values associated with a corresponding feature is determined based on a ratio of (i) the past search records that are relevant and are associated with the corresponding feature to (ii) a total number of records associated with the corresponding feature.

17. A non-transitory computer readable storage medium configured to store program code, the program code comprising instructions that, when executed by a processor, cause the processor to perform steps comprising:

receiving a user query that specifies one or more characteristics;

creating multiple features derived from the characteristics specified in the user query;

identifying multiple records in a database based on the features;

inputting the records identified into a computer model trained to rank the records based on likelihoods of the records being relevant to the user query, wherein (i) the computer model comprises relevancy weights for the features, and (ii) the computer model is trained by a training using a set of initial weights that are expectation values of the relevancy weights of the features to increase a speed of convergence of the training, wherein the training further comprises adjusting a ranking performance metric of the computer model via adjusting the relevancy weights through increments of changes, and a size of the increments is determined based on a sensitivity of the ranking performance metric relative to the size of the increments; and providing a ranked list of records in response to the user query.

18. The non-transitory computer readable storage medium of claim 17, wherein the training set comprises past search records, and the adjusting of the ranking performance metric comprises:
   arranging the past search records by a first rank list based on a first set of weights,
   determining a first value of the ranking performance metric based on the first rank list,
   changing the first set of weights to a second set of weights through changing each weight in the first set by an increment,
   arranging the past search records by a second rank list based on the second set of weights,
   determining a second value of the ranking performance metric based on the second ranking, and
   comparing the second value to the first value.

19. The non-transitory computer readable storage medium of claim 18, wherein the relevancy determinations of the past search records based on past user actions associated with the past search records comprises:
   determining a past search record as relevant in response to a data log of the past user actions indicating that a user performed an action associated with the past search record, and
   otherwise, determining the past search record as irrelevant.

20. The non-transitory computer readable storage medium of claim 17, wherein one of the expectation values associated with a corresponding feature is determined based on a ratio of a frequency of the corresponding feature being present in past relevant search results to a total number of past search records associated with the corresponding feature.

* * * * *